US006743281B1

(12) United States Patent
Miller

(10) Patent No.: US 6,743,281 B1
(45) Date of Patent: Jun. 1, 2004

(54) AIR FILTRATION INDICATOR

(75) Inventor: David Miller, Jackson, TN (US)

(73) Assignee: Delta International Machinery Corp., Jackson, TN (US)

( * ) Notice: Subject to any disclaimer, the term of this patent is extended or adjusted under 35 U.S.C. 154(b) by 0 days.

(21) Appl. No.: 10/213,615

(22) Filed: Aug. 7, 2002

(51) Int. Cl.$^7$ ............................................ B01D 35/143
(52) U.S. Cl. .......................... 96/416; 96/417; 96/418; 96/422; 55/DIG. 34; 116/DIG. 25
(58) Field of Search .......................... 96/416, 417, 418, 96/422; 55/DIG. 34; 116/DIG. 25

(56) References Cited

U.S. PATENT DOCUMENTS 2,746,416 A * 5/1956 Aufderheide ............... 116/275
4,342,133 A * 8/1982 Minton ........................ 15/339
5,131,932 A * 7/1992 Glucksman .................. 96/422

* cited by examiner

Primary Examiner—Robert A. Hopkins
(74) Attorney, Agent, or Firm—Suiter West PC LLO

(57) ABSTRACT

A fluid filtration system, such as an ambient air cleaner, employs a measurement mechanism to determine the amount of fluid flow through the system. The measurement system provides data or actuates an indicator. The indicator may have a pointer to indicate fluid flow along a gradient display that contains numeric information and/or is color coded. Alternatively, fluid flow may be displayed electronically. The indicator may be protected within a separate housing that projects from a filtration unit housing or may be disposed within a recess of the filtration unit housing.

36 Claims, 6 Drawing Sheets

AIR FILTRATION INDICATOR

FIELD OF THE INVENTION

The present invention generally relates to the field of fluid filtration, and, particularly, to an apparatus and method for detecting when a filter used for filtering air or other fluid is to be replaced.

BACKGROUND OF THE INVENTION

Air filtration systems are used in a variety of applications for filtering particulate matter from air and other fluids. For example, air filtration systems are found in woodshops, kitchens, furnaces, semiconductor clean rooms, mines, elevator shafts, air conditioning systems, submersible vehicles, space vehicles, and other areas where the air may be contaminated by dust and other particles.

As air filters extract particulate matter, a build up of residue forms on their surface over time requiring their replacement. Normally, such residue particles are small making it difficult to perform a visual inspection of them. Thus, visual inspection of the air filter is inconvenient and less than fully trustworthy. Accordingly, good filters are often thrown away prematurely, while needed replacements are not provided on a timely basis. Further, equipment operators and other users forget to inspect the provided filters and assign the task of inspecting the filter a low priority.

Therefore, it would be desirable to provide an apparatus and method that would clearly indicate to a user that a filter needs to be replaced especially for an ambient air filter.

SUMMARY OF THE INVENTION

Accordingly, the present invention is directed to an air filtration indicator for indicating when a filter used for filtering particulate matter from air or other fluid needs to be replaced.

In particular, the present invention relates to a fluid filtration system that includes a filter for filtering the fluid received from the fluid intake, a fluid flow measurement mechanism for measuring a fluid flow rate of the filtered fluid from the filter, and an indicator that for displaying a fluid flow rate. The fluid flow measurement mechanism includes a flap and a shaft that rotate in unison. It is the rotational movement of the flap and/or shaft that determines the rate of fluid flow through the apparatus.

The present invention offers an easy to implement method for determining if an air (or, fluid) filter needs to be replaced. It is done through an effective arrangement of an indicator display. The display and detection mechanism may be implemented very simply through a purely mechanical system or may also involve electronic components including electronic displays.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
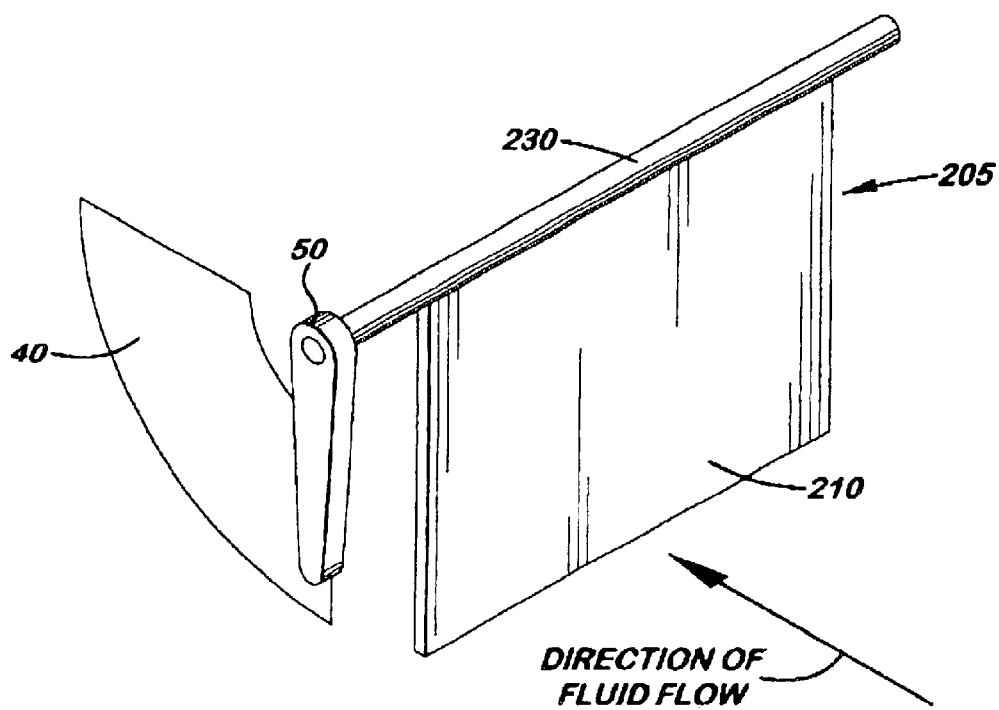
FIG. 1 illustrates the essential features of the present invention in an embodiment.

FIG. 1 illustrates an exemplary embodiment of the essential features of the present invention. The basic features include a flap 210 suspended or supported in an air channel by a shaft 230. The flap 210 and shaft 230 rotate in unison according to the pressure placed upon the flap. Another basic feature of the present invention is an indicator indicia 40 that provides information about the air flow as measured by the flap 230. Variations of the present invention include translating the rotary motion of shaft 230 to provide airflow information that may be either mechanically or electronically displayed. FIG. 1 shows an embodiment in which the rotary motion of the shaft 230 directly drives a pointer 50 that passes over indicator indicia 40.

Figure 2:
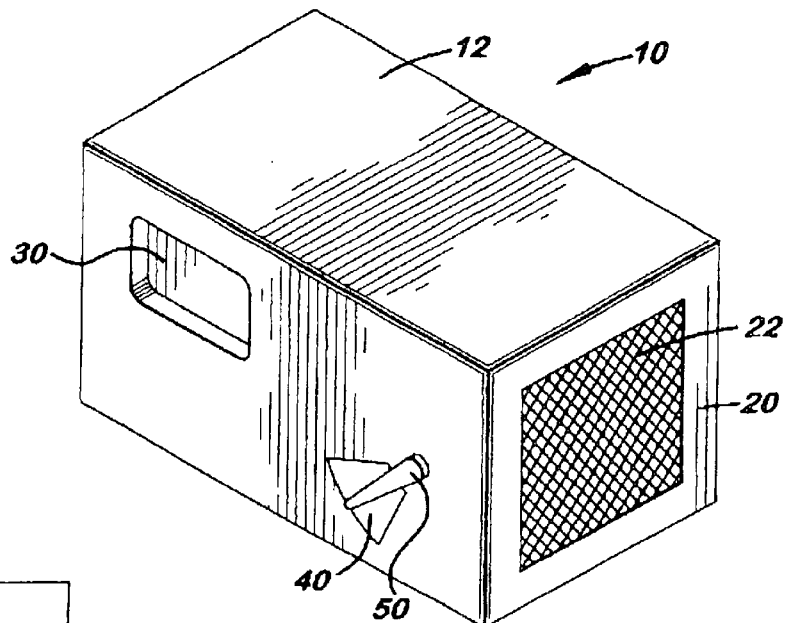
FIG. 2 illustrates an air filtration system that incorporates the elements of FIG. 1 of the present invention.

FIG. 2 illustrates an air filtration system in accordance with the present invention. The air filtration system 10 includes a fluid filtration system housing 12 that provides an entrance 20 for air or other gas or fluid to enter. The housing 12 may have a tight fitting construction so that only channeled fluid passes through it and may be formed of plastic, metal, or other suitable material. In the exemplary embodiment, entrance 20 may include a protective grate 22 formed of mesh, fabric, or other porous material, as the application requires, to keep out material that might immediately damage or clog interior filters. An internal or external pointer 50 indicates the movement of fluid after the fluid has been filtered. The indicator 40 may be color coded, numeric, or otherwise fashioned to provide an easily readable display with pertinent information, such as a gradient, to be displayed for repair or maintenance personnel or other users. Indicators may be disposed on both sides of the housing 12 or may be disposed on top of it.

Figure 3:
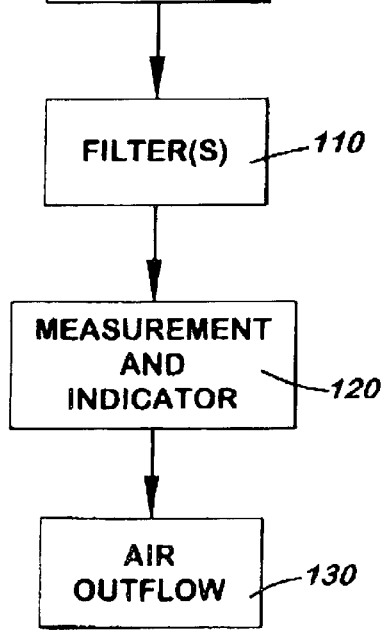
FIG. 3 illustrates a representative process for the present invention.

FIG. 3 illustrates an air filtration process of the present invention. A fluid intake 100, which may correspond to the entrance of the housing 12, passes a fluid into the housing 12. In embodiments of the invention, the fluid may be moved through the housing 12 by a pump or blower. The fluid intake 100, corresponding to entrance 20 and grate 22, may perform prefiltering or have a blocking effective to protect the more fragile elements within the housing. One or more filters 110 may pass the fluid through and trap particulate matter that is over a certain size. For instance, the air intake may pass objects smaller than 1 centimeter, the first filter may pass particles under 50 microns, and the second filter may pass particles under 5 microns. In the case where several filters are used, the first filter, which may be a prefilter, may be the coarsest filter to remove the largest particles, while the last filter may be the finest filter to remove the smallest particles. Two or more filters, which have the same filtering ability, may be used in tandem to provide a redundant effect to ensure that particulate matter over a certain size is filtered out in case of defects or damage in one of the filters. The filtered fluid flow rate is measured by a measurement detector and indicator 120, variations of which are presented throughout this disclosure. In essence, the flow rate of a fluid, especially a gas or gas mixture, may be measured by the degree of rotational movement experienced by a flap suspended or support on a rotary shaft within the path of airflow. The degree of rotation may be used to derive a measurement value of the airflow. After passing by the flap, the fluid leaves the unit through an outlet 130.

Other variations of arranging the filters and the measurement detector and indicator are possible. For example, the measurement detector and indicator 120 may be placed after the first filter or may even be placed after the fluid intake 100 and in front of the filters when the fluid intake has some filtering effect. Also, multiple measurement detectors and indicators may be placed between various filters.

Figure 4:
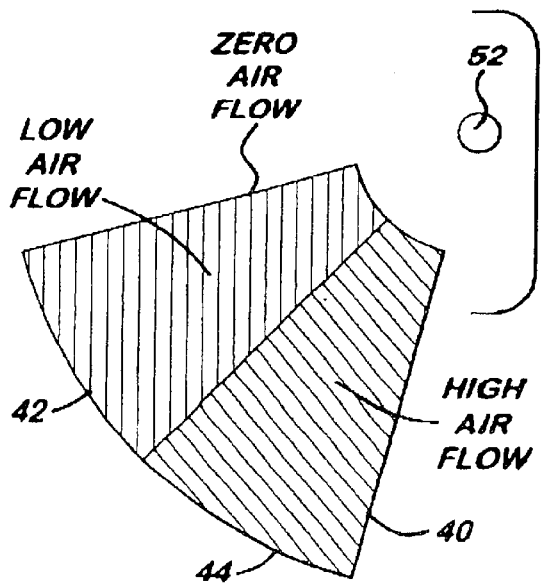
FIGS. 4 and 5 illustrate an indicator scheme of the present invention.
Figure 5:
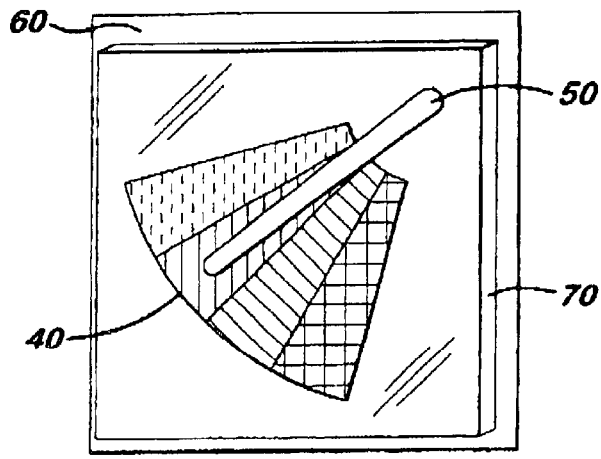

FIGS. 4 and 5 illustrate an exemplary indicator. In one embodiment, the indicator 40 may be disposed within a recess within the housing 12. This arrangement affords greater protection to the indicator in the event the housing brushes up against something during transportation or someone or something collides with the housing. In another embodiment, the indicator may be unprotected or may be disposed in its own housing to afford a user easier access to the indicator 40 itself.

As shown in FIG. 4, the indicator is divided into multiple zones. Although two are shown here, there may be three, four, or more. The zones 42 and 44 may be color coded to facilitate recognition that the unit is not performing or not performing well. For example, the low fluid flow zone 42 may be color coded red and the high fluid flow zone 44 may be color coded green. More varied color coding schemes may be employed such as green, yellow, and red, or green, chartreuse, yellow, orange, and red. Glow in the dark paint or pigment used to form the indicator may be advantageous to a home owner who checks the furnace filter in the dark or under poor lighting conditions. In general, the color-coding indicator may be applied to the housing by painting, spraying, printing, adhering a label, or the like. Aside from, or in addition to, color-coding, numeric values may be placed on the indicator with or without color-coding to provide calibrated information such as airflow in cubic feet per minute. The arrangement of the numeric values may be linear or may be logarithmic for scaling in making measurements. Furthermore, alphabetic, alphanumeric, or other characters or indicia may be used as part of the indicator, such as providing text that reads "REPLACE FILTER". The housing 70 in FIG. 5 protects the indicator and may be made of a variety of materials, including metal or plastic. The housing 70, as an independent structure, may snap onto or be screwed onto housing 12. A window 60 may be retentively placed within the housing 70. In exemplary embodiments, the window 60 may be formed of plastic, glass, or any other suitable transparent or translucent material. Preferably, the window 60 and indicator housing 70 may be made as shallow as possible to reduce the risk of collision damage with a person or object. Further, the window 60 may be a liquid crystal window, which is opaque when the fluid filtration unit is turned off and transparent when it is powered up.

Alternately, the fluid filtration housing 70 may contain a window that allows direct viewing of the flap. The flap may be of a particularly noticeable color and may be of a luminescent material so as to act as a pointer itself and provide an indicating means with fewer component parts. The flap or indicator may include a material, which changes color in response to temperature. In this manner, the flap may serve as an independent, crude temperature gauge. Markings on the housing itself may show flow rate values or fault conditions.

Figure 6:
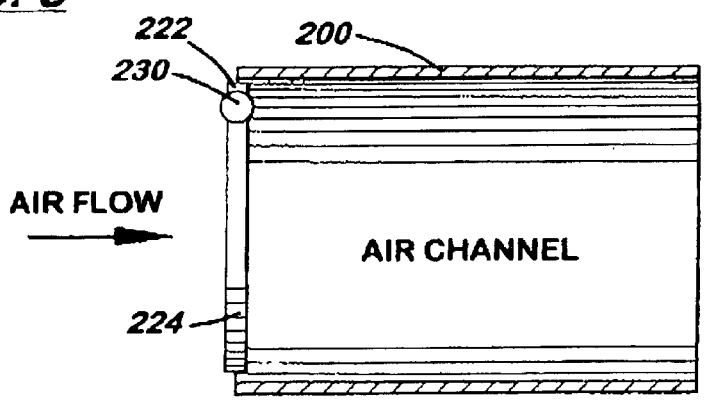
FIGS. 6–8 illustrate the placement of a measuring device within an air channel in the present invention.
Figure 7:
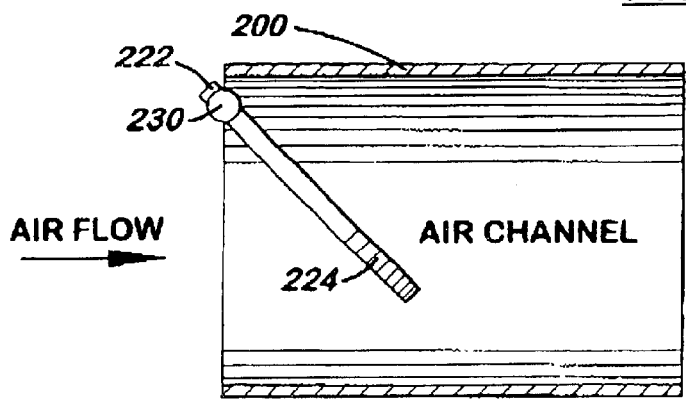
Figure 8:
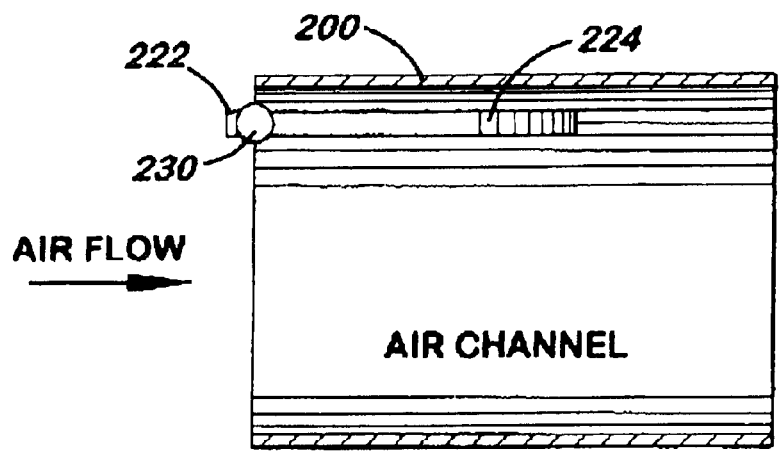

FIGS. 6 through 8 illustrate the placement of the measurement device within the fluid channel of the filtration unit in which FIG. 6 illustrates a state in which there is no airflow, FIG. 7 illustrates an intermediate airflow state, and FIG. 8 illustrates a maximal airflow state. The measurement device 205 includes a flap 210, which is fixedly attached to a rotatable shaft 230. Although the rotatable shaft 230 is shown as approximately near the top of the channel with respect to the flap (i.e., opposite the direction of gravitational attraction), it may be located within the top half of the fluid channel. The greater range of movement provided by placing the shaft near the top of the channel may allow finer measurements of the rate of fluid flow if the indicator is coupled to the end of the flap. The size and weight of the flap may be adjusted to measure the applicable fluid flow. The flap 210 may have an upper section 222 and a lower section 224. In this embodiment, the flap 210 has a normal vertical orientation in which the lower section 224 may rise up to the level of the upper section 222. The flap 210 may be formed from metal, plastic, or other rigid or at least substantially rigid material that moves the shaft 230 so as to provide an accurate measurement of the airflow. The fit of the flap 210 to the channel walls may allow a gap or space or may be in loose or tight contact. The lower end 224 of the flap 210 may be weighted to facilitate the flap's return to an initial vertical state when fluid or air flow stops. In an alternative embodiment, flap 210 may consist solely of lower section 224; that is, there would be no upper section. The advantage of this alternative embodiment is that it would maximize efficiency of air flow.

Figure 14:
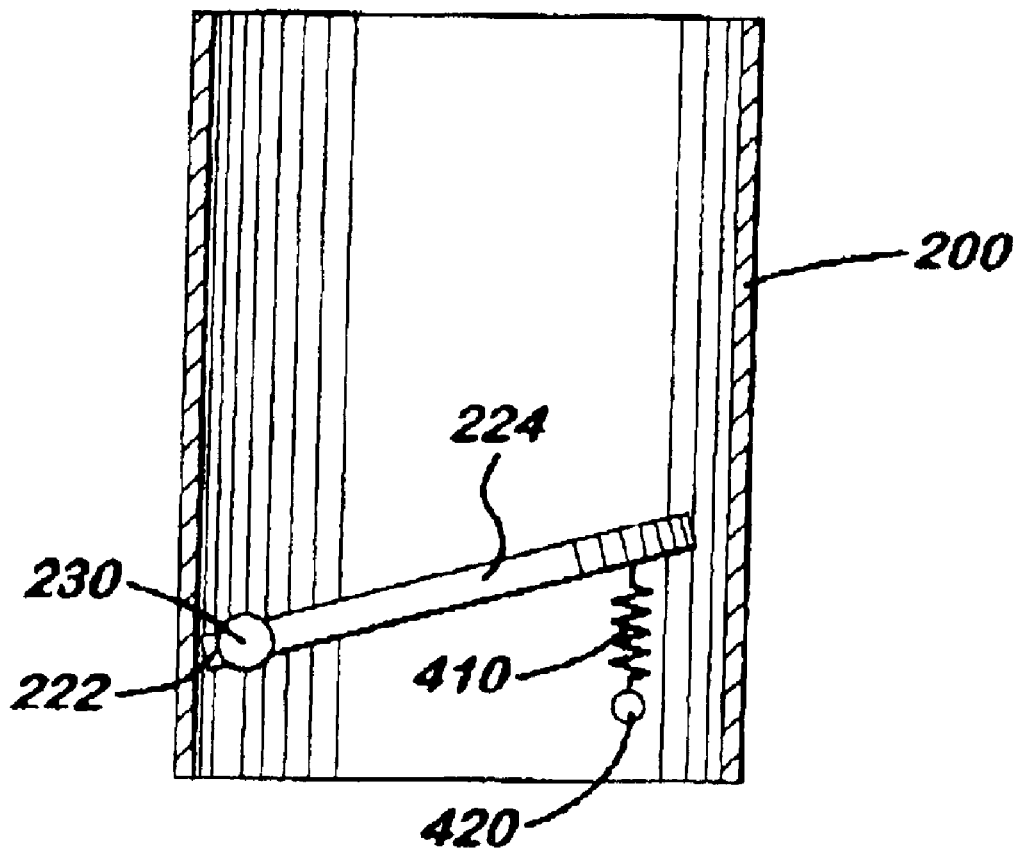
FIG. 14 illustrates an air channel in which the shaft is oriented vertically.

The flap 210 may pivot about a vertically oriented shaft provided that the flap experiences a difference in pressure between its left and right sides during fluid flow. As fluid enters the channel, the flap 210 rotates under pressure at a certain angle. The rotary movement of the shaft 230 drives the pointer. For a vertically oriented shaft, a spring mechanism, such as a spring 410 and a stationary post 420 for securing the spring, may be used to return the flap to an initial, closed position, as shown in FIG. 14. The initial, closed position of the flap 210 corresponds to a warning condition to an operator that there is no or substantially limited airflow. The arrangement of a vertically oriented shaft is especially useful when the air intake is on a ceiling or is extended horizontally or at an angle.

Figure 9:
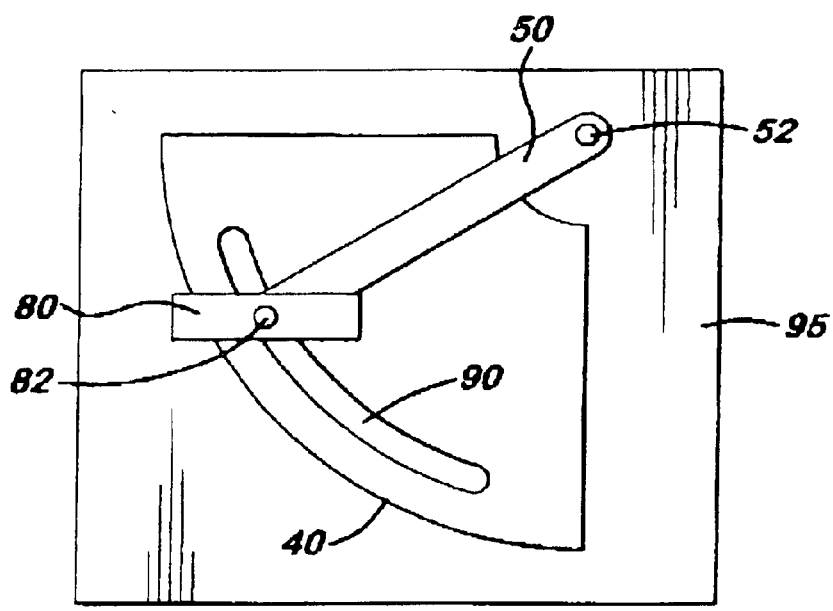
FIG. 9 illustrates a variant indicator gauge of the present invention.

Alternately, the pointer 50 may be driven by an attachment at the end of a flap. This attachment may be rod shaped and may be guided by a track or slot. For greater accuracy, tracks or slots may be placed on both sides of the end of the flap to guide the movement of the flap. FIG. 9 illustrates another embodiment of the indicator 40 in which the flap itself drives a bar 80 which is rotatable about pivot 82. The bar 80 may be weighted so that it retains a horizontal orientation as the pointer 50 which carries it rotates about the pivot point 52 that is secured to the shaft 230 of FIGS. 6 through 8. A slot 90 is provided to aid in the travel of the bar 80 such as by placing a guide opposite the pivot point 82 which passes into or through the slot 90. In this embodiment, the pointer may be located either within or external to the housing of the fluid filtration housing unit.

Figure 10:
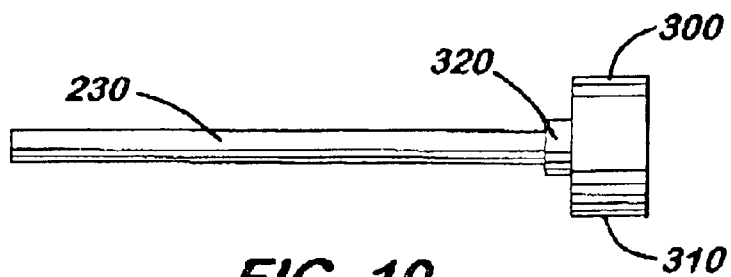
FIG. 10 illustrates a measurement device of the present invention that uses the flap support shaft to set a resistance value.

FIG. 10 illustrates a mechanism that relates pressure on the flap to a measurable value. As the shaft rotates, the rotatable portion 320 of the potentiometer 300 turns relative to potentiometer housing 310 to set a resistance value.

Figure 11:
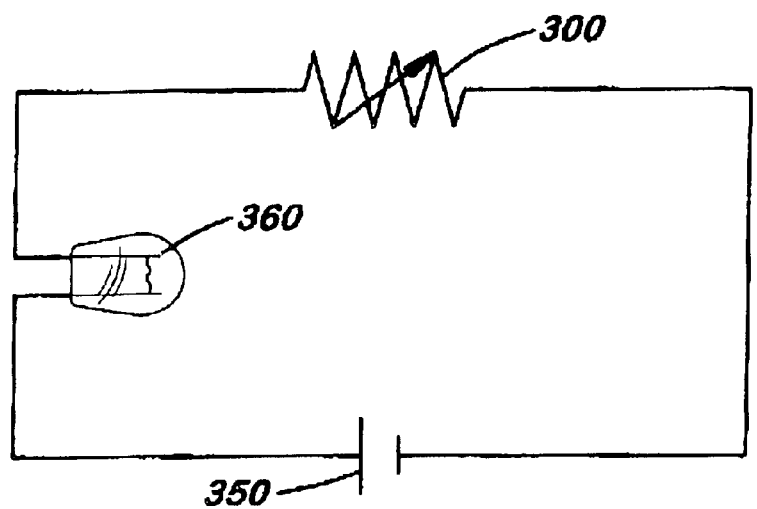
FIG. 11 illustrates an exemplary circuit that provides a visual signal for a condition of the air filter in the present invention.

FIG. 11 illustrates an exemplary indicator circuit that uses a variable resistance such as provided by the mechanism of FIG. 10. The variable resistance 300 of the potentiometer is connected to a power source 350 and a visual indicator 360. The visual indicator may be a light emitting diode or some other light source. The light may experience a change of color and/or intensity or may blink in response to a change of current determined by the variable resistance 300. The indicator 360 may be, instead or additionally, a buzzer or other audible indicator. In this embodiment, the variable resistance 300 is always supplying current to the indicator 360. As an alternative, the variable resistance may be used to actuate a switch to toggle the indicator 360 completely on or completely off.

Figure 12:
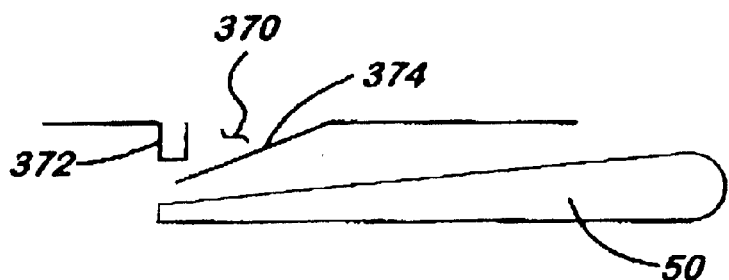
FIG. 12 illustrates an alarm mechanism when the airflow reaches a certain level in the present invention.

FIG. 12 illustrates a variation in which an indicator is activated when there is little or no fluid flow. In this embodiment, a mechanism has a pointer 50 that mechanically actuates a switch 370 at the end of its travel. The position of the pointer 50 when it actuates the switch 370 corresponds to a fault zone. The switch 370 has an arm 374 that is pushed by the pointer 50 to electrically close the switch by contacting the contact point 372.

Figure 13:
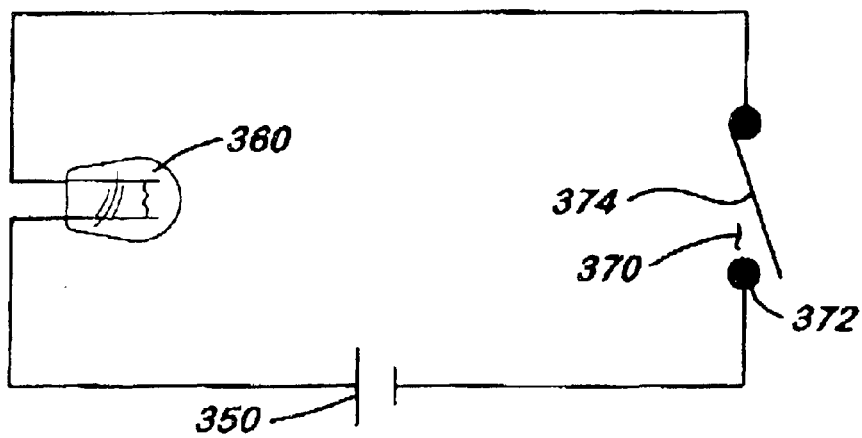
FIG. 13 illustrates a circuit incorporating the alarm mechanism of FIG. 11.

FIG. 13 illustrates an indicator circuit, which uses a switch. When the switch 370 is closed, a light 360 or buzzer may be activated.

A gear mechanism may be used to vary the fineness of the calibration of the indicator, to amplify shaft motion to actuate a 360 degree dial, to convert a rotary motion of the shaft to a linear motion of a bar used as part of the indicator in which the bar may have a horizontal, vertical, or angled linear motion, or to mechanically translate the measurement information to another part of the housing.

The indicator need not be limited to a static display, but may use a dynamic electronic display such as an electrochromic, liquid crystal, electroluminescent, or plasma display or may be an array of light emitting diodes by translating the rotary motion of shaft 230 into an electrical measurement that may be displayed electronically for an operator.

The present invention is primarily directed to an air filtration system in which the collection of dust on the air filter reduces or stops airflow, but may be practiced with any filtration system or detection system in which there is fluid flow.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An ambient air filtration system, comprising:
   a housing;
   an air intake on a side of the housing, the air intake receiving ambient air;
   a first air filter within the housing which filters the ambient air it receives from the air intake;
   an airflow measurement mechanism within the housing that measures an airflow rate of the filtered air from the first air filter, the air flow measurement mechanism including a flap supported by a shaft within an air channel after the first air filter;
   an indicator coupled to the air flow measurement mechanism which displays the air flow rate measured by the air flow measurement mechanism, the indicator including a pointer that is driven by the shaft; and
   an air outlet for passing the filtered ambient air out of the housing.

2. The ambient air filtration system of claim 1, the air flow measurement mechanism including a flap.

3. The ambient air filtration system of claim 1, the indicator including a static display.

4. The ambient air filtration system of claim 1, the indicator including a dynamic display.

5. The ambient air filtration system of claim 1, further comprising a second air filter within the housing which receives the filtered air after its air flow rate has been measured by the air flow measurement mechanism.

6. The ambient air filtration system of claim 1, further comprising a second air filter within the housing which is disposed intermediate the first air filter and the air flow measurement mechanism.

7. The ambient air filtration system of claim 1, the housing having a transparent window.

8. The ambient air filtration system of claim 7, the airflow measurement mechanism including a flap that is color-coded so as to be noticeable when viewed through the transparent window.

9. The ambient air filtration system of claim 1, wherein the indicator is color-coded.

10. The ambient air filtration system of claim 1, wherein the shaft is horizontally oriented.

11. The ambient air filtration system of claim 1, wherein the shaft is vertically oriented.

12. The ambient air filtration system of claim 11, wherein the flap actuates the indicator.

13. The ambient air filtration system of claim 12, wherein the indicator is electrical.

14. The ambient air filtration system of claim 12, wherein the indicator is located on a top of the housing.

15. The ambient air filtration system of claim 12, wherein the indicator is located at a bottom of the housing.

16. A gas filtration system, comprising:
    a means for receiving a gas;
    a means for guiding the flow of the gas;
    a means for filtering the gas;
    a means for measuring the flow rate of the gas, the means for measuring being at least partly electronic;
    a means for indicating a characteristic regarding the flow rate of the gas.

17. The gas filtration system of claim 16, the means for measuring being strictly mechanical.

18. The gas filtration system of claim 16, the means for guiding being hermetic.

19. The gas filtration system of claim 16, the means for indicating including a means for electronically displaying.

20. The gas filtration system of claim 16, the means for indicating being strictly mechanical.

21. The gas filtration system of claim 16, the means for receiving a gas including a means for filtering.

22. An ambient air filtration system, comprising:
 a housing;
 an air intake on a side of the housing, the air intake receiving ambient air;
 a first air filter within the housing which filters the ambient air it receives from the air intake;
 an airflow measurement mechanism within the housing that measures an airflow rate of the filtered air from the first air filter, the air flow measurement mechanism including a flap supported by a vertically oriented shaft within an air channel after the first air filter;
 an indicator coupled to the air flow measurement mechanism which displays the air flow rate measured by the air flow measurement mechanism; and
 an air outlet for passing the filtered ambient air out of the housing.

23. The ambient air filtration system of claim 22, the air intake filtering the ambient air.

24. The ambient air filtration system of claim 22, the indicator including a static display.

25. The ambient air filtration system of claim 22, the indicator including a dynamic display.

26. The ambient air filtration system of claim 22, further comprising a second air filter within the housing which receives the filtered air after its air flow rate has been measured by the air flow measurement mechanism.

27. The ambient air filtration system of claim 22, further comprising a second air filter within the housing which is disposed intermediate the first air filter and the air flow measurement mechanism.

28. The ambient air filtration system of claim 22, the housing having a transparent window.

29. The ambient air filtration system of claim 28, the airflow measurement mechanism including a flap that is color-coded so as to be noticeable when viewed through the transparent window.

30. The ambient air filtration system of claim 22, the indicator including a pointer that is driven by the shaft.

31. The ambient air filtration system of claim 22, wherein the indicator is color-coded.

32. The ambient air filtration system of claim 22, wherein the shaft is horizontally oriented.

33. The ambient air filtration system of claim 22, wherein the flap actuates the indicator.

34. The ambient air filtration system of claim 33, wherein the indicator is electrical.

35. The ambient air filtration system of claim 33, wherein the indicator is located on a top of the housing.

36. The ambient air filtration system of claim 33, wherein the indicator is located at a bottom of the housing.

* * * * *